United States Patent
Kamdar et al.

(10) Patent No.: US 9,972,041 B2
(45) Date of Patent: May 15, 2018

(54) EARMARKING A SHORT LIST OF FAVORITE DOMAIN NAMES OR SEARCHES

(71) Applicant: Go Daddy Operating Company, LLC, Scottsdale, AZ (US)

(72) Inventors: Tapan Kamdar, San Jose, CA (US); Garrett Matsudaira, Bellevue, WA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 334 days.

(21) Appl. No.: 14/625,523

(22) Filed: Feb. 18, 2015

(65) Prior Publication Data
US 2016/0239899 A1   Aug. 18, 2016

(51) Int. Cl.
  G06Q 30/00   (2012.01)
  G06Q 30/06   (2012.01)
  H04L 29/12   (2006.01)

(52) U.S. Cl.
  CPC ....... G06Q 30/0629 (2013.01); H04L 61/302 (2013.01); H04L 61/3025 (2013.01)

(58) Field of Classification Search
  CPC .................................. G06Q 30/06; G06F 15/16
  See application file for complete search history.

(56) References Cited

U.S. PATENT DOCUMENTS

| | | |
|---|---|---|
| 6,298,341 B1 | 10/2001 | Mann et al. |
| 6,332,158 B1 | 12/2001 | Risley et al. |
| 6,338,082 B1 | 1/2002 | Schneider |
| 6,519,589 B2 | 2/2003 | Mann et al. |
| 6,745,248 B1 | 6/2004 | Gardos et al. |
| 6,760,746 B1 | 7/2004 | Schneider |
| 6,876,997 B1 | 4/2005 | Rorex et al. |
| 6,895,430 B1 | 5/2005 | Schneider |
| 6,901,436 B1 | 5/2005 | Schneider |
| 6,973,505 B1 | 12/2005 | Schneider |
| 6,980,990 B2 | 12/2005 | Fellman |
| 7,000,028 B1 | 2/2006 | Broadhurst et al. |
| 7,039,697 B2 | 5/2006 | Bayles |
| 7,130,878 B2 | 10/2006 | Parsons et al. |
| 7,143,048 B1 | 11/2006 | Ruben et al. |

(Continued)

FOREIGN PATENT DOCUMENTS

| | | |
|---|---|---|
| JP | 2002297938 | 10/2002 |
| WO | 9909726 | 2/1999 |

OTHER PUBLICATIONS

DomainNICnames home page, Jul. 23, 2002.
(Continued)

*Primary Examiner* — Courtney L Stopp
(74) *Attorney, Agent, or Firm* — Quarles & Brady LLP

(57) ABSTRACT

Systems and methods of the present invention provide for one or more server computers communicatively coupled to a network and configured to: generate a list of suggested available domain names and an associated user interface control; receive, from a client computer, a selection of a favorite domain name; store the selection in a repository of favorite domain name data; synchronize the repository with local favorite domain name data on the client; and identify, via machine learning, an aggregate or individual trend within the repository of domain name data.

14 Claims, 8 Drawing Sheets

(56) References Cited

U.S. PATENT DOCUMENTS

| | | | |
|---|---|---|---|
| 7,188,138 B1 | 3/2007 | Schneider |
| 7,194,552 B1 | 3/2007 | Schneider |
| 7,299,299 B2 | 11/2007 | Hollenbeck et al. |
| 7,305,394 B2 | 12/2007 | Fellman |
| 7,418,471 B2 | 8/2008 | King et al. |
| 7,565,630 B1 | 7/2009 | Kamvar et al. |
| 7,596,515 B2 | 9/2009 | Eckel, Jr. |
| 7,606,858 B2 | 10/2009 | King et al. |
| 7,627,628 B2 | 12/2009 | King et al. |
| 7,664,831 B2 | 2/2010 | Cartmell et al. |
| 7,689,458 B2 | 3/2010 | Heckerman et al. |
| 7,702,902 B2 | 4/2010 | Thayer et al. |
| 7,890,602 B1 | 2/2011 | Parsons et al. |
| 8,037,168 B2 | 10/2011 | Schneider |
| 8,046,693 B2 | 10/2011 | Oliver |
| 8,276,057 B2 | 9/2012 | Rowe et al. |
| 8,301,743 B2 | 10/2012 | Curran et al. |
| 8,706,728 B2 | 4/2014 | Nicks et al. |
| 2002/0065903 A1 | 5/2002 | Fellman |
| 2002/0091703 A1 | 7/2002 | Bayles |
| 2002/0091827 A1 | 7/2002 | King et al. |
| 2002/0120537 A1 | 8/2002 | Morea et al. |
| 2002/0194373 A1 | 12/2002 | Choudhry |
| 2003/0149690 A1 | 8/2003 | Kudlacik et al. |
| 2004/0162895 A1 | 8/2004 | Mok et al. |
| 2004/0162916 A1 | 8/2004 | Ryan |
| 2004/0167982 A1 | 8/2004 | Cohen et al. |
| 2004/0199493 A1 | 8/2004 | Ruiz et al. |
| 2004/0172463 A1 | 9/2004 | King et al. |
| 2004/0199608 A1 | 10/2004 | Rechterman et al. |
| 2005/0114484 A1 | 5/2005 | Wilson et al. |
| 2005/0125451 A1 | 6/2005 | Mooney |
| 2005/0172031 A1 | 8/2005 | Adelman |
| 2005/0203891 A1 | 9/2005 | Broadhurst et al. |
| 2005/0216288 A1 | 9/2005 | Parsons et al. |
| 2005/0234921 A1 | 10/2005 | King et al. |
| 2005/0256853 A1 | 11/2005 | Fellman |
| 2006/0004784 A1 | 1/2006 | Ableman |
| 2006/0015942 A1 | 1/2006 | Judge et al. |
| 2006/0101155 A1* | 5/2006 | Damour ............... G06Q 30/02 709/238 |
| 2006/0106793 A1 | 5/2006 | Liang |
| 2006/0161682 A1 | 7/2006 | King et al. |
| 2006/0168020 A1 | 7/2006 | Brennan |
| 2006/0218303 A1 | 9/2006 | Adelman et al. |
| 2006/0230380 A1 | 10/2006 | Holmes et al. |
| 2006/0235824 A1 | 10/2006 | Cheung et al. |
| 2006/0271668 A1 | 11/2006 | Parsons et al. |
| 2007/0180056 A1 | 8/2007 | Assad |
| 2007/0198495 A1 | 8/2007 | Buron et al. |
| 2007/0208869 A1 | 9/2007 | Adelman et al. |
| 2007/0271393 A1 | 11/2007 | Wong |
| 2007/0299815 A1 | 12/2007 | Starbuck et al. |
| 2008/0005127 A1 | 1/2008 | Schneider |
| 2008/0040329 A1 | 2/2008 | Cussen et al. |
| 2008/0071909 A1 | 3/2008 | Young et al. |
| 2008/0222125 A1 | 9/2008 | Chowdhury |
| 2008/0270418 A1 | 10/2008 | Chen et al. |
| 2008/0270486 A1 | 10/2008 | Hind et al. |
| 2008/0307049 A1 | 12/2008 | Curran et al. |
| 2008/0307085 A1 | 12/2008 | Curran et al. |
| 2009/0006351 A1 | 1/2009 | Stephenson et al. |
| 2009/0094137 A1 | 4/2009 | Toppenberg et al. |
| 2009/0241066 A1 | 9/2009 | Costello |
| 2009/0248734 A1 | 10/2009 | Adelman et al. |
| 2009/0248735 A1 | 10/2009 | Adelman et al. |
| 2009/0292696 A1 | 11/2009 | Shuster |
| 2010/0070448 A1 | 3/2010 | Omoigui |
| 2010/0250353 A1 | 9/2010 | Zimmerman et al. |
| 2011/0016022 A1 | 1/2011 | Essawi et al. |
| 2011/0055248 A1 | 3/2011 | Consuegra et al. |
| 2011/0125830 A1 | 5/2011 | Adelman |
| 2011/0125831 A1 | 5/2011 | Adelman |
| 2011/0208513 A1 | 8/2011 | Nicks et al. |
| 2011/0208723 A1 | 8/2011 | Nicks et al. |
| 2012/0072407 A1 | 3/2012 | Shyamsunder |
| 2013/0086081 A1 | 4/2013 | Schonfeld et al. |
| 2013/0304818 A1 | 11/2013 | Brumleve et al. |
| 2014/0032589 A1 | 1/2014 | Styler et al. |
| 2014/0143331 A1 | 5/2014 | Smith et al. |
| 2014/0188651 A1 | 7/2014 | Krueger |
| 2015/0026192 A1 | 1/2015 | Kamerman et al. |

OTHER PUBLICATIONS

The Domain Name Exchange, http://www.web.archive.org/web/20001019034237/http://afternic.com, Oct. 19, 2000.
The Domain Name Exchange, http://www.web.archive.org/web/19991127181836/http://afternic.com, Nov. 27, 1999.
Google SafeSearch Filtering (http://web.archive.org/web/20030702191745/http://www.google.com/intl/en/help/customize.html), Jul. 2003, WaybackMachine.
Matt Mazur, CNET!—Let's see what happens (Domain Pigeon), Apr. 9, 2009.
GoDaddy.com screen shot, http://web.archive.org/web/20030401091726/www.godaddy.com/gdshop/default.asp?e=com.
www.GoDaddy.com screen shot, Dec. 6, 2002.
Internet Practice Solutions—Domain Registration Services [Online], Apr. 4, 2001.
Lowensohn, Domain Pigeon now finds open Twitter Names, Apr. 9, 2009.
"Domain Name Search." Jan. 31, 2001. www.domainsearch.com.
A Major Domain to be Sold at Auction on Oct. 30—WebChat.com—Offers Premium Web Presence and Growth Opportunity in the Booming Online and Mobile Communications Industry.
Sedo to host "Around the world in seven days" online Auction, PR Newswire, Europe Including UK, Feb. 11, 2008, downloaded from ProQuestDirect on the Internet on Mar. 11, 2013, 2 pages.
MapQuest Online Mapping Software as seen on Apr. 16, 2009.
Margaret Rouse (Crawler, TechTarget: SearchSOA, Apr. 5, 2005). http://searchsoa.techtarget.com/definition/crawler.

* cited by examiner

EARMARKING A SHORT LIST OF FAVORITE DOMAIN NAMES OR SEARCHES

FIELD OF THE INVENTION

The present invention generally relates to the field of domain names and specifically to the field of selecting, and storing, a short list of favorite domain names or a short list of domain name searches from a generated list of search results or suggested domain names.

SUMMARY OF THE INVENTION

The present invention provides systems and methods comprising: a repository of favorite domain name data and at least one client computer communicatively coupled to the network and configured to: receive at least one selection of at least one favorite domain name via at least one user interface control associated with a list of suggested available domain names displayed during a domain name search session; access the repository of favorite domain name data; and display a list of favorite domain names. The present invention may also comprise a server computer communicatively coupled to a network and configured to: generate the list of suggested available domain names; receive, from the at least one client computer, the at least one selection; synchronize the repository of favorite domain name data with at least one local favorite domain name data on the at least one client computer; and identify, via machine learning, at least one aggregate or individual trend within the repository of domain name data.

The above features and advantages of the present invention will be better understood from the following detailed description taken in conjunction with the accompanying drawings.

DETAILED DESCRIPTION

Figure 1:
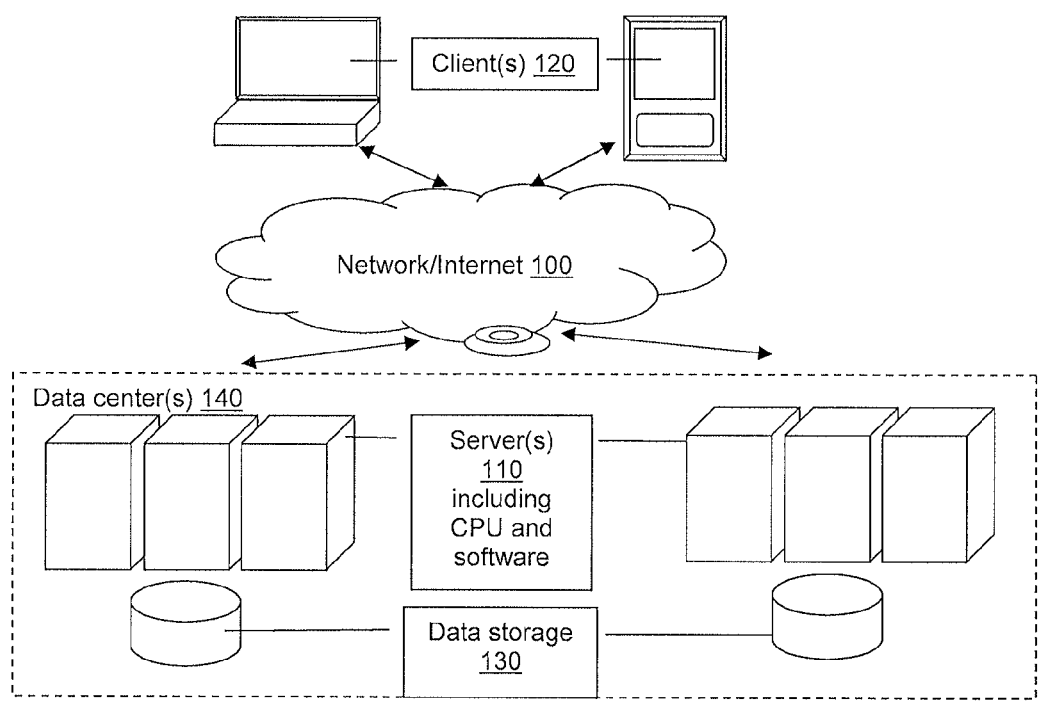
FIG. 1 illustrates a possible system for notifying users of selecting a short list of favorite domain names or searches from a generated list of search results or suggested domain names.

The present invention will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses.

As the Internet has grown in size and influence, Domain names have become a digital asset with significant value. Because of this, users seeking to register domain names may put a great deal of effort into trying to find the ideal domain name. Many users will search domain names with a specific Top Level Domain (TLD—e.g., .com) and/or Second Level Domain (SLD—e.g., "example" in the domain name example.com) that they want to register.

Customer perception continues to reflect an outlook that ".com is king." Domain name search records continue to confirm that .com TLDs are especially popular and continue to dominate domain name registrations.

Users may search for domain names out of curiosity, or may have seen suggestions for available domain names that trigger ideas for additional domain name searches for the user. Users will often search for domain names via domain name search tools such as a text box that receives a domain name search string from the user. These domain name search tools may be available as part of a domain name search software interface, possibly found on a registrar or other domain name services website.

Over time, unavailable domain names may become available because of disuse, where a registrant drops a domain name or allows it to expire. A domain name drop list may comprise a list containing expired domain names soon to be deleted from a domain name registry, and may be used to identify expiring domain names with value.

Unavailable domain names may also become available because the domain name registrant wishes to sell the domain name at auction in a domain name aftermarket. Domain name aftermarkets may comprise any secondary market for domain names. Parties in a domain name aftermarket may register bids or negotiate prices to transfer registration from the registered holder to a new registered holder of that domain name.

Applicant has identified multiple weaknesses in presently existing systems and methods for searching, selecting and registering domain names. No options in presently existing systems and methods allow a user to create a short list of favorite domain names or domain name searches that reflect the user's interest in the domain names prior to entering a purchase path. A user may be unsure whether they want to purchase a domain name, but may not want to lose their research, including the original search parameters used, regarding an available list of search results and/or domain name suggestions. Currently, a customer's only options with regard to searched and recommended domain names or searches include registering the domain name, adding the domain name to a shopping cart (if available) or ending the domain name search session, thereby risking the loss of the user's domain name research, such as the parameters used to generate the desired search results.

Limiting domain name search options to purchasing the domain name, adding the domain name to the shopping cart and/or ending the domain name search session present multiple problems. First, saving individual domain names to a shopping cart or registering the domain name may divert the user from the domain name search and suggestion navigation, so all information relating to the search and suggestion algorithms must be re-run for the user to recover and display their prior research. This means a user has no way to track domain names that they may have an interest in, but are not yet committed to register and/or purchase.

Also, using current methods and systems, neither the user nor the registrar has any way to track either the user's interest in particular domain names or trends of other general users' interests. Currently, a user cannot remember or save their favorite domain searches or suggestion options across searches, sessions and/or devices because the current shopping-cart-or-purchase model provides no means of storing the user's choices across sessions, or synchronizing these sessions at a central location accessible to all client devices.

From a registrar perspective, there is currently no way to track and learn from such user interest. Without broader data about the user or users generally to indicate interest in domain names that have not been registered or added to a shopping cart, there is no way for registrars or other domain name registering entities to track this aspect of the users' interest. Specifically, a domain name registrar may want to customize a user experience or merchandising opportunities by applying machine learning to user interest patterns. These user interest patterns may include price points, preferred extensions (e.g., TLDs) and preferred subject matter (e.g., keywords in SLDs). Unfortunately, the data needed for such customization may be severely limited without available data beyond registered domains or those saved to shopping carts.

Applicant has therefore determined that optimal systems and methods will provide means for a user to generate and save a short list of favorite domain names from a generated list of searched and/or recommended domain names. In such systems, the user may select and add favorite domain names from the generated list of searched and recommended domain names.

Favorite domain names may include domain names that customers considered buying at some point, and selected to be added to a short list, but did not commit to registering the names or adding them to a shopping cart. A user may select these favorite domain names by interacting with a user interface control (e.g., link, button, checkbox, drop down, radio button, slider, etc.) configured to indicate a user's interest in the selected domain name without being required to register the domain name, add it to a shopping cart or otherwise navigate away from the search and recommendation navigation or functionality.

This short list may be stored within data storage in association with the user, so that the user may access, across user sessions on any available client devices, the short list and/or the searches that generated them. Thus, a user may run a domain name search on a first client device during a first session, then pick up the search on a second client device during a second session. The short list of favorite domain names may be recalled from data storage and displayed on any available client device as a list in a single view, providing an easy method for users to remember domain names of interest.

Likewise, favorite domain name search sessions may include domain name search sessions that customers would like to remember or re-run, which may be selected to be added to a similar short list. A user may select these favorite domain name search sessions, possibly by interacting with a user interface control such as a (e.g., link, button, checkbox, drop down, radio button, slider, etc.) configured to indicate a user's interest in saving the domain name search session.

This short list of favorite domain name search sessions may be stored within data storage in association with the user, so that the user may access, across user sessions on any available client devices, the short list and/or the favorite domain names that were selected during or after the saved domain name search session. Thus, a user may begin a domain name search on a first client device during a first session, then pick up the same search session during a second session. The short list of favorite domain name search sessions may be recalled from data storage and displayed on any available client device as a list in a single view, providing an easy method for users to remember domain name search sessions of interest.

The data stored in data storage may be utilized by users and registrars alike to compare domain names based on multiple domain name attributes including price, similarity to the users' initial searches, preference of domain extensions such as TLDs, and preference for concepts determined from keywords in SLDs.

As a non-limiting example, the data from selection of favorite domain names may indicate that one or more users like and have considered registering particular names at a given price point and including a particular TLD or subject matter within the SLD, but have not yet committed to the purchasing or registering them.

Registrars may benefit from such data, since insights into general interest in such data would provide more robust body of quality data than Is available via domain shopping cart or registration selections. Specifically, optimal systems and methods may generally identify and track users' favorite domain names and domain name search sessions, and may specifically learn patterns of users' preferred price points, preferred extensions and preferred subject matter. This machine learning based on favorite domain name data may also be applied specifically to the individual user, allowing the registrar or other entity to customize and personalize the user's interface, administration and/or merchandizing experience.

These patterns within the broader and more high quality data may be identified via machine learning to improve the relevance of domain name recommendations to customers and may be applied to future search results. In other words, by analyzing the short list of favorite domain names by aggregate and individual users, the registrar may have access to data to improve the quality of search results of all future users, as well as users individually. This data may also be useful in merchandising of domain names based on short list favorites. In addition, over a duration of time, rules which may be considered specific to users could also be applied to similar users, to test or explore if those merchandising suggestions fare well for others.

In addition to the above-disclosed advantages, the disclosed invention allows a user to span multiple search sessions by aggregating domain names that interest them into a single personalized result set. When a user creates their favorites list they are able to do the following: continue searching for the right domain name(s) without having to redo prior searches for names they already found; take action on one, several or all domains like purchase, delete/dismiss; and/or make sure that all domains on their list are still available. In addition, the usage of favorites may function outside of the disclosed embodiments (i.e. in app purchases where a user purchases a hosting plan and chooses a qualifying free domain). In such embodiment, the domain name may be presented to user based on machine learned data from favorites and a user may chooses one of the domains from their favorites list.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

Figure 2:
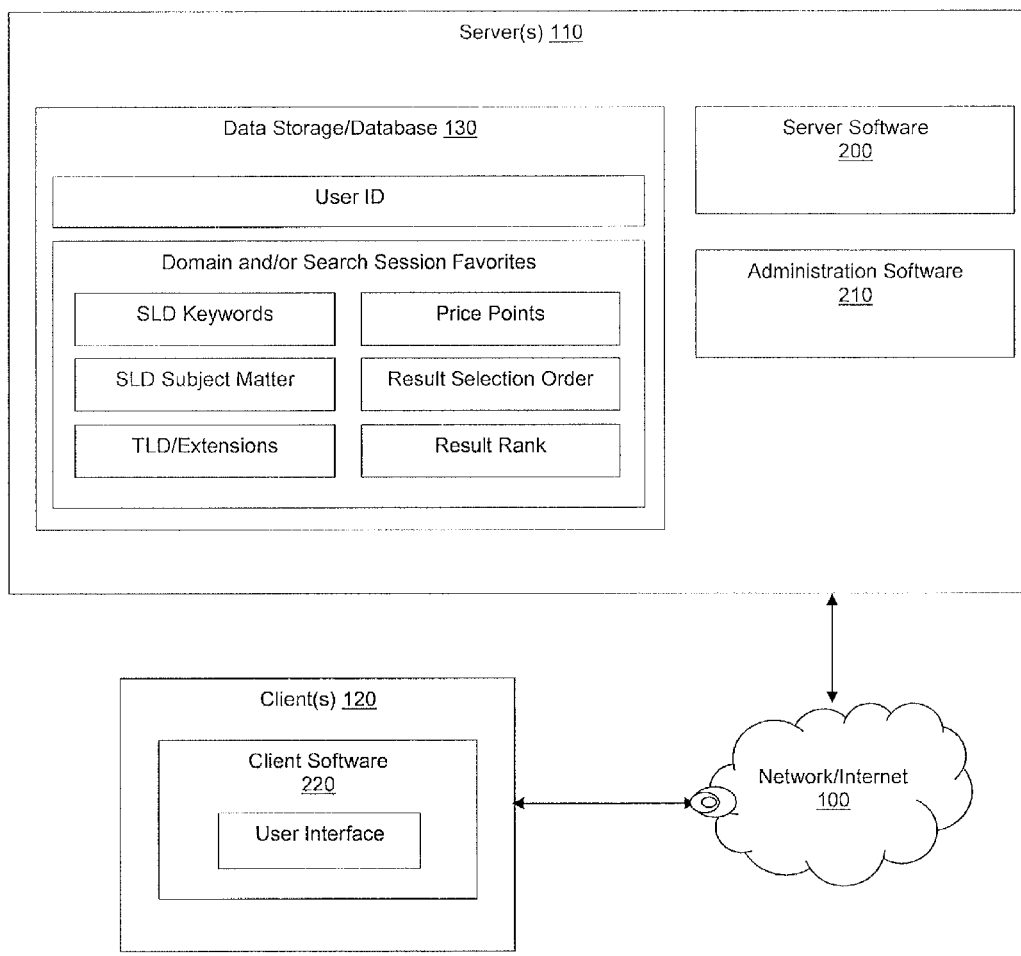
FIG. 2 illustrates a more detailed possible system for selecting a short list of favorite domain names or searches from a generated list of search results or suggested domain names.
Figure 3:
FIG. 3 is an example user interface used in a possible embodiment for selecting a short list of favorite domain names or searches from a generated list of search results or suggested domain names.

FIG. 2 shows a more detailed example embodiment of an environment for the systems, and for accomplishing the method steps, disclosed herein. As non-limiting examples, all disclosed software modules 200 may run on one or more server(s) 110 and may include one or more user interfaces generated by the server(s) 110 and transmitted to and displayed on the client(s) 120. The user interface(s) may be configured to receive input from the user and transmit this input to the server(s) 110 for the administration and execution of the software 200, using data in data storage 130 associated with the software modules 200. Thus, the disclosed system may be configured to execute any or all of the method steps disclosed herein.

Server(s) 110 may be hosted by any entity, possibly a hosting provider, a domain name registrar, a website development company, any other software service provider or any combination thereof. To manage users of such a system, including individuals or organizations, server(s) 110 may host and run a user administration program 210 such as GoDaddy's My Account control panel for management of hosting and domain names, as a non-limiting example.

In such an administration control panel program, or admin 210, each user may be assigned a user id. This user id may identify transactions performed by each user. These transactions may be stored as data records in data storage 130, each data record including the user id to associate the user with the transaction in data storage 130.

The data records may also store contact data for each user, possibly including email, SMS, social media account data, etc. to contact the user for any contact purposes disclosed herein. In some embodiments, the user may select specific contacts as a means of contact for purposes of receiving notice as disclosed in the current invention.

The admin 210 may include a Domain Control Center (DCC) for administration of domain names registered to the user. As non-limiting examples, the DCC may include means for listing and managing all domain names registered to the registrant, possibly including auto renewal of the domains, DNS record settings, etc. In some embodiments, the DCC may be used to display the disclosed notices, reports and/or domain name purchase offers, as described in more detail herein.

The user may select settings from the admin 210 to control administration of the disclosed invention. In addition, sever software 200 running on server(s) 110 may analyze all transaction data received in association with any given user id (or with all transaction data received), calculate appropriate parameters for the administration of the disclosed invention, and/or may set calculated optimal default parameters, as discussed in detail below. Thus, any combination of user settings and/or software calculations for user parameters may be used to manage the disclosed invention.

A user may purchase and install client software 220 on client(s) 120. In some embodiments, the client software 220 may comprise a server/client model, possibly web services and/or other web-based software provided through a web browser running on client(s) 120. This software may comprise software modules 220 configured to communicate with the server software 200 running on server(s) 110 in order to accomplish the method steps disclosed herein.

Server software modules 200 may comprise one or more domain search and favorites selection software modules, which may be configured to search for a domain name using any techniques known in the art for searching and determining the availability of a domain name. As a non-limiting example, a domain name registrar, such as GoDaddy, may provide a domain name search tool website for users to enter searches for domain names or domain name keywords to determine whether the desired domain name is available. Client software 220 may then be configured to transmit the domain name search parameters to server(s) 110.

Server(s) 110 may be configured to receive and save, possibly in association with the user id, the transmitted parameters for the domain name search request session, and server software 200 may be configured to process the search request to determine the availability of the searched domain names, according to any techniques known in the art. The results of this domain name search may be transmitted to, and displayed on client(s) 120.

Server software 200 may further be configured to suggest and/or recommend domain names according to any domain name suggestions, recommendation or other domain name spinning techniques known in the art. Server(s) 110 may then be configured to transmit the recommended domain names to client(s) 120 for display.

Server software 200 may generate and order suggestions for domain names according to any domain name suggestion or other search result-ranking algorithm known in the art. As noted herein, this domain name suggestion ranking may be customized according to user feedback from the aggregation of all users, and/or may be customized to a specific user based on previous user selections, favorites or feedback loop data as described herein.

FIGS. 3-7 demonstrate an example embodiment for searching domain names and selecting favorite domain names from the search results, including a user interface for client software 220. In this example embodiment, the user has searched the keywords phoenix and bicycles. If the user during this session chooses to save this search session as a favorite search session, server software 200 may identify the search parameters for the search session, possibly including the search terms phoenix and bicycles and save them as parameters for a favorite search session.

In this embodiment, the displayed domain names may comprise a list of all search results and/or suggested domain names related to the domain name search of the keywords phoenix and bicycles. Server software 200 may determine that phoenixfin.com, phoenixbicycle.us phoenixcycles.us where the closest matches for available domain names. These matches may be displayed in the "Your Results" area of the user interface.

Each entry within the list may comprise a user interface control. Any user interface control may be used including a link, checkbox, drop down, radio button, etc., allowing the user to click, tap or otherwise select a particular domain name to be added to the short list of favorite domain names and/or a favorite search session to added to the short list of search sessions. In the example embodiment(s) seen in FIGS. 3-7, the interface control may include a graphic and/or mobile device selection "switch" for tapping or sliding a selection, in this case, phoenixbicycle.us, to indicate that it is a domain name favorite.

In FIGS. 3-7, the selection may be complete as the user slides the selection to the right, and an icon identifying that the selected domain name is a favorite may slide into view to replace the favorite domain name, in this case, phoenixbicycle.us. The converse may also be true of deselecting the favorite domain name, where the selection moves from right to left, replacing the favorite domain name icon with the original domain name search result entry, as would be the case moving from FIG. 7 to FIG. 3.

Server software 200 may be configured to add each selected domain name to the short list of favorite domain names. Client software 220 may receive the user input from the user interface control indicating interest in and intent to add the domain name to the short list of favorites.

Client(s) 120 may transmit all data related to the selected favorite domain name(s) and/or search sessions to server(s) 110. For each of the favorite domain names, this data may comprise any data specific to the favorite domain name and/or search session, including, but not limited to: a user id associated with the user account and/or user session that selected the favorite domain name; a rank of the domain name within the order of the list of search results and/or recommended domain names; an order that the favorite domain name was selected relative to other favorite domain names; a price point for registering the favorite domain name, one or more keywords within the domain name SLD; a TLD associated with the favorite domain name; the search parameters for a favorite domain name search session; etc.

Server(s) 110 may be configured to receive any combination of this data for each of the favorite domain names and/or search sessions, and may store it in association in data storage 130. The data received for each individual domain name and/or search session favorite may be aggregated into a collection of data specific to that user. In some embodiments, the data received for each of the individual domain name and/or search session favorites may be aggregated together with data received for domain name and/or search session favorites received by all users. This stored and aggregated data may be used in the analysis and customization algorithms described herein.

At any time during a user session, the user may retrieve, display and/or register the list of domain names they have selected and stored. To accomplish this, the user may access and utilize client software 220 to display their list of favorite domain names, select the domain names for registration and access the appropriate domain name registration and/or shopping cart software to purchase the domain name registration.

Likewise, the user may retrieve and/or display the list of domain name search sessions they have selected and stored. To accomplish this, the user may access and utilize client software 220 to display their list of favorite domain name search sessions, select the domain name search session(s) to re-run the domain name searches in the domain name search session(s).

In some embodiments, client software 220 may be configured to display domain name search results and/or recommended domain names, as well as receive selections of the user's domain name favorites, while the client software 220 is offline. As non-limiting examples, the user may be able to browse domain name search results and/or recommended domain names even though client(s) 120 and/or client software 220 are not connected with the Internet, are not otherwise communicatively coupled to network(s) 100, are unable to connect to or access server(s) 110, are not logged in to a user account, have not initiated a user session and/or have recently installed client software 220.

Client software 220 may utilize similar algorithms to those disclosed in order to generate, display and receive a selection of a local copy of favorite domain names while the user is offline. Specifically, client software 220 may be configured to receive the user's local selections of favorite domain names, as well as all relevant data related to each selected domain name, and store the selection and data locally. In some embodiments, the local storage of the selections and data may require a command from the user to store the data locally and/or offline.

Client software 220 may then be configured to store the selections and data locally in any known local format. As non-limiting examples, client software 220 may store the selections and data on the local client device 120 as cookies, in a local database, as one or more cache files within software 2xx, as an XML or other markup language file, as a local text file, etc.

As a new connection between client(s) 120 and server(s) 110 is established, client software 220 and/or server software 200 may be configured to identify all data associated with each of the locally saved favorites in association with the user id and/or user session, and download or otherwise transfer this data to server(s) 110 for storage in association with the user account. As a non-limiting example, the connection between client(s) 120 and server(s) 110 may occur as the user: logs into the user's account via the user id; searches domain names, registers domain names; or moves a domain names to a shopping cart. This synchronization process may be repeated for all client(s) 120 associated with the user, so that all domain name favorites may be synchronized in centralized data storage 130 in association with the user account.

This synchronization may occur by updating all local domain name favorite data received since the last user login, with existing domain name favorite data in data storage 130. For example, server software 200 may identify any local domain name favorites data that does not already exist in data storage 130, as well as any other updates or deletions affected locally on client(s) 120 since the client software 220 was last connected with server(s) 110. Server software may then add, update and/or delete the related records in data storage 130 appropriately. This process may be repeated with local domain name favorite data on each of the clients associated with the user id, until all local domain name favorites data is merged with domain name favorite data stored in data storage 130.

Thus, the compiled list of domain name favorites associated with the user id may be available across all client devices 120 and user sessions. Because local data relating to the favorite domain names is regularly updated on the server 110 and centrally available via the server's data stores 130, users may access their favorite domain names across any user session, using any client 120 device. As users log in, server software 200 may detect the login and may access the user's user id as well as all data associated with domain name favorites for that user id. Server(s) 110 may then generate and transmit the favorite list for display on an client(s) device 120 in use by the user.

As a non-limiting example of the synchronization and availability of favorite domain names, a user may install an app for client software 220 on a mobile device without accessing their user account or otherwise connecting to server(s) 110. The software may include a list of domain name suggestions, and the user may select five favorite domain names from the domain name list and log in to their user account. Server software 200 may then detect the login and add the data for the five favorite domain names to data storage 130 in association with the user id for the user session.

The user may likewise install a desktop application for client software 220 on their desktop computer without connecting to the Internet, connecting with server(s) 110 or otherwise accessing their user account. The user may select three additional favorite domain names from the list of suggested domain names, then log in to their account. Server software 200 may then detect the login and add the three new favorites, in association with the user id, to the five favorites already existing in data storage 130. Likewise, if any favorite domain names were modified, deleted or otherwise updated, the appropriate data records in data storage 130 may be updated accordingly.

Server software 200 may use the centralized data in data storage 130 related to favorite domain names and/or search session data to create a data feedback loop and analyze it according to machine learning algorithms. This data feedback loop may be designed, implemented and utilized according to any of the data feedback loop and/or machine learning algorithms disclosed in application Ser. No. 14/569,348 to Lai et al., which is incorporated in its entirety herein by reference.

As applied to the current invention, the disclosed systems and methods may collect feedback, in the form of the disclosed data for favorite domain names and/or search sessions, from users on an ongoing basis. As new user data is received, it may be stored, aggregated and compared with general results from all users. This data may be continually analyzed and refined as domain name favorites are received from individual users.

This refined data may benefit both individual users and domain name system administrators such as domain name registrars. As disclosed below, individual users may benefit from more customized or personalized user experiences, domain name suggestions and notice of other interested parties created through the data collected from their feedback.

The system administrator may also benefit from the aggregation of user feedback generated through domain name and/or search session favorites. These benefits may include, as non-limiting examples, improvements to the quality and ranking of generated domain search result and suggestions, increased sales bundled registrations of favorite domain names and/or greater motivation for users to register domain names that have been added to the favorites short list, but are not being registered (via knowledge of additional interested parties in favorite domain names). The details of these benefits are described in detail below.

Feedback data associated with favorite domain names and/or search sessions, on the level of both individual users, as well as the aggregation of all users generally, may be analyzed over time identifying trends, distributions, curves and/or averages across all clicks or other user input for favorite domain name selections performed by all users. However, in some scenarios, an individual user's selections may be too far outside the general trends, distributions, curves and/or averages to affect the aggregation of general feedback data. In these instances, the feedback data may be used to customize the user experience specifically to that user individually. It should be noted, however, that over a duration of time, rules which might be considered specific to users could also be applied to similar users, to test/explore if those merchandising suggestions fare well for others.

The determination of the threshold between individual and general feedback data may be based on analysis of choices made by a majority of users, and outliers from this general trend. As a non-limiting example, most users may select .com results to add to their list of favorites. Because of this, when a .com version of a favorite domain name (e.g., TLD.net) is available, it may be recommended to the user in the majority of cases.

In another example, a user may search for a name, such as sfparkingmeter.com, and most users may be likely to add singular/plural versions of the TLD, such as sfparkingmeters.com. If the singular/plural version was suggested, but the customer consistently picks alternate names (e.g. Misspellings—sfparkinmeter.com, sfparkingmeeter.com), that would be outside of general threshold and would be considered specific to the user.

In a final example, a user may search for a name, and most users may add traditional TLDs (e.g. com/net/info) to their favorites list. If a user consistently adds gTLDs/ccTLDs to their favorite list, the feedback threshold would be specific to the user.

By analogy, the clicks or other user input for favorite domain name and/or search session selections may be similar to keywords in search engines, wherein search engines use the feedback from these keyword clicks to determine the rank in which search results will be returned and the order in which they will be displayed. Likewise, the feedback loop data for favorite domain names and/or search sessions, both individually and in the aggregate, may be used to change, improve and/or customize the ranking, order and/or display of domain name search results and domain name suggestions over time.

As noted above, the data returned with each selected favorite domain name, and which may be used in the feedback loop, may include a domain name rank as displayed and an order in which the domain name favorite was selected relative to other domain name favorites. The server may compare the position of each selected favorite domain names with the position of each search result/recommended domain name in the original list transmitted to the client(s) 120. The server(s) 110 may then determine that the selected domain names indicate the intent of the user that a particular domain name grabbed their attention, while the domain names before or after that domain name in the list did not grab their attention.

The server may then apply machine learning to this data as found in the application incorporated by reference above, both as applied to all aggregated data on a general user level, as well as specifically to that user. The server(s) 110 may then assign positive worth to the name selected and assign a negative worth (and/or a fractional negative worth) to the position of the options passed over to get to that result. Any options in the list below the selections would be ignored, since it's unclear whether the user engaged with those selections or not. The final worth of each search result/recommended domain name may determine the order of domain search results and domain name suggestions in future searches.

As a non-limiting example, users may consistently select a domain name suggestion displayed in the 5th position of a list of domain name suggestions. If the individual user, or all users, consistently select the domain name suggestion at position 5 for that search to add to their domain name favorites, over time, the server software 200 may determine that the result at position 5 is the most relevant, and may begin to display that result closer to the top of the list of domain name suggestions. As a result, the domain name suggestions at positions 1 2 3 and 4 will be pushed down over time.

Thus, both generally and individually, the feedback loop data may be used to change, improve and/or customize the ranking, order and/or display of domain name search results and domain name suggestions over time.

In addition to the position of the selection, additional factors may be used to determine conversion rate. As non-limiting examples, these may include: meta-type of results (traditional TLD, ccTLD, gTLD); pricing of results clicked/skipped; aftermarket results clicked/skipped; filters used by users before selecting a domain which was purchased; etc.

The feedback loop data for favorite domain names may also be applied, both individually and in the aggregate, in the analysis of the quality of domain name search results and/or domain name suggestions. The keywords searched during the user's query, as well as explicit domain names relevant to the search and added to the user's domain name and/or search session favorites, may be added to the domain and/or search session favorite data, both individually and in the aggregate, to determine domain names to be recommended in the future.

As noted above, the data returned with the selected favorite domain names include an SLD and a TLD of each favorite domain name. Server software 200 may be configured to identify, at both the individual and aggregate level, popular trends in topics from the SLDs as well as popular trends in TLDs or other domain name extensions. The software may be configured to use the feedback loop and/or machine-learning algorithms to recognize these trends and recommend future domain names accordingly.

These recommended future domain names may be identified by parsing the SLD of the favorite domain names selected. Any tokenization algorithms known in the art may be used to parse the SLD to identify these keywords. Logic may then determine, from the keywords, topics of interest within the user's selections of favorite domain names and/or search sessions. This logic may then determine future recommended domain names based on these topics of interest.

Similarly, recommended future domain name suggestions may be identified by TLD or other domain name extension.

The feedback loop data, both individually and in the aggregate, may be used to recommend domain names based on TLDs or other extensions associated with favorite domain names and/or search sessions. Server(s) 110 may identify the TLD and make domain name recommendations accordingly. As a non-limiting example, if a customer, no matter what other search results or suggestions are presented, is only selecting favorite domain names with a .com TLD/extension, server software 200 may determine that .coms should be presented either exclusively or more frequently to that customer, since the data suggests that is all the customer likes to register.

Similarly, server software 200 may analyze the domain name portfolios of users and determine that a majority of domain names in their portfolio are .coms. In these cases, the server software 200 may be configured to user searches, additions to carts and/or purchases to understand the users' preferences. Based on those, server software 200 may be configured to suggest variations on .com names (e.g., misspellings, singular/plurals, words added at the start/end, pronouns/verbs added in between, etc.), and suggest new gTLDs based on the users' price and overall relevance of theme to the .com domain names purchased (e.g. If customer profile has legal names, suggest .law, .lawyer, etc.).

As noted above, the data returned with each selected favorite domain name may include a price. This, along with the other feedback loop data disclosed above, may be used to increase and personalize merchandising opportunities and user content, both in the aggregate, and for users individually.

These merchandising opportunities may include, as non limiting examples: identifying ideal price points for users generally or specifically, possibly bundling favorite domain names at or near the ideal price point; customizing domain names and sales offered via a registrar's front of site or domain name aftermarket; customizing domain name administration, sales or other administration controls available via domain name administration control panels such as MYA or DCC; and notifying users of interest in their favorite domain names by other users.

As noted above, the data returned with selected domain name favorites may include the price of each favorite domain name. Software on server(s) 110 may be configured to analyze this feedback loop data, both individually and in the aggregate, and customize merchandising of domain names.

Specifically, the feedback data may be applied to determine and recommended domain names to users based on price. As a non-limiting example, if the results for all favorites for a user, or in the aggregate, may be priced under $15. Server software 200 may be configured accordingly to customize search results and recommended domain names, both generally or to specific users, based on this $15 price point.

As a non-limiting example, if a customer selects favorite domain names under $10, showing suggestions for names >$15 might not motivate the users to consider those names on their merit because of the price. Likewise, if a customer has never selected a premium name as a favorite, showing suggestions for premium names as well as registry premiums (higher priced non-aftermarket names) would not be relevant to the user. If a user has a mixture of $10 and $40 names, showing names in the same range would let the users consider names on their merit. For a domain bundle, individual names may be discounted dynamically and grouped into sets of 2, 3 or 4 to incentive a user to purchase more names. Based on the customers price preferences, the discounting on the individual/overall group of names may be adjusted accordingly.

The analysis of prices of favorite domain names may be combined with the feedback loop data for SLDs and TLDs described above, and applied to determine and recommended domain names to users based on a price point. Thus, recommended domain names based on the feedback loop data associated with SLDs and TLDs may be discounted to be within the price point determined for general users or for the user individually.

In other words, if the user has specific domain names saved to their favorite domain names, the software may use these domain names to determine domains similar to a purchased domain name and provide users with a discount on names similar to registered domain names that were originally stored as favorites. So if a user were to register a .guru name for $40, and the system determines from the feedback loop data that the user's average price spent on registering domain names is only $20, then if .guru domain names are currently on sale for $20, the software may be configured to automatically notify the customer of a sale based on domain names that the user has shown interest in which are on sale at a price point the user may be interested in, possibly using the notification means described below.

In some embodiments, the software may determine that the domain names saved to favorites for the user share a common SLD subject matter and/or TLD to a domain name that the user has registered. In these embodiments, to encourage the user to register the domain names currently stored as favorites, the software may calculate a price point similar to that of the registered domain name, or based on user's price point history generally. The software may then generate an offer to the user, bundling all the related favorite domain names at the calculated price point, and notify the user, thereby encouraging the user to move their favorite domain names to fully registered domain names.

As a non-limiting example, if a user has added five different names to their favorite list and registers one of them, If the software determines that all five domain names are relevant to the same name which was registered based on SLD subject matter or common TLD, the software could generate a domain name bundle with each bundled domain name being set at a similar price to the registered domain name.

In some embodiments, the software may be configured to notify customers, possibly using the notification or customization methods described below, when other customers are specifically looking for names added to their favorites list. To accomplish this, software may be configured according to any of the notice techniques disclosed in application Ser. Nos. 14/591,758 and 14/591,778 to Kamdar et al., which are incorporated in their entirety herein by reference.

As a non-limiting example, server software 200 may be configured to calculate how many searches for each of the user's favorite domain names have been executed in the past 30 days. The software may then be configured to notify the user that there seems to be an active interest in this name, since customers are specifically looking for it. Alternatively, the software may be configured to calculate and notify the customer that there are, for example, 30 other customers who have added it to their favorite list. Both scenarios may create an urgency, from a customer perspective, to register the domain names in their favorites list. If a customer has not purchased any names, the duration of time for which the name search would be conducted could be increased.

Any user interface generated and displayed for the purpose of searching or registering domain names may be customized according to the feedback loop data associated with the users' favorite domain names, either individually or in the aggregate, to highlight domain name specials based on subject matter, TLD, price points, or additional interest in favorite domain names. The user interface may be personalized for a registrar website home page on a computer or mobile device, a domain registrar app, or any related domain name administration control panel such as My Account or DCC.

Server software 200 may be configured to generate and customize general as well was individual content on a registrar and/or domain name aftermarket front of site. As a non limiting example, a user may access a user interface such as a registrar's home page. The feedback loop data for all users in the aggregate may indicate a high number of .vegas domain name favorites and/or registrations. The registrar home page may therefore be customized to highlight sales on .vegas domain name registrations.

However, server software 200 may be configured to determine the highest number of favorites, by TLD and price point, more relevant to each individual user. The registrar's home page may be customized, therefore, to display the domain names that are on sale on the registrar's home page specific to that user. For example, if a particular user had several favorite domain names that containing a .guru TLD at a particular price point (e.g., $15-$20), the sale on the registrar's home page may note that .guru is on sale for $15 or $20 upon login to the user account. The Top N TLDs a user would consider purchasing next or the Top N next names the user might purchase would be used in conjunction with ongoing site sales to message appropriately.

Any notification means known in the art may be used to notify users of favorite domain names, sales, additional user interest, etc. Server software 200 may use the centralized domain name favorites data in data storage 130, as well as any techniques above, to alert users of other users that have the same favorite domain names. As non-limiting examples, server software 200 may generate and transmit, based on favorite domain name data: recommendations, email reminders, additional customer search volume, etc. to bring the customers back to the website.

Figure 4:
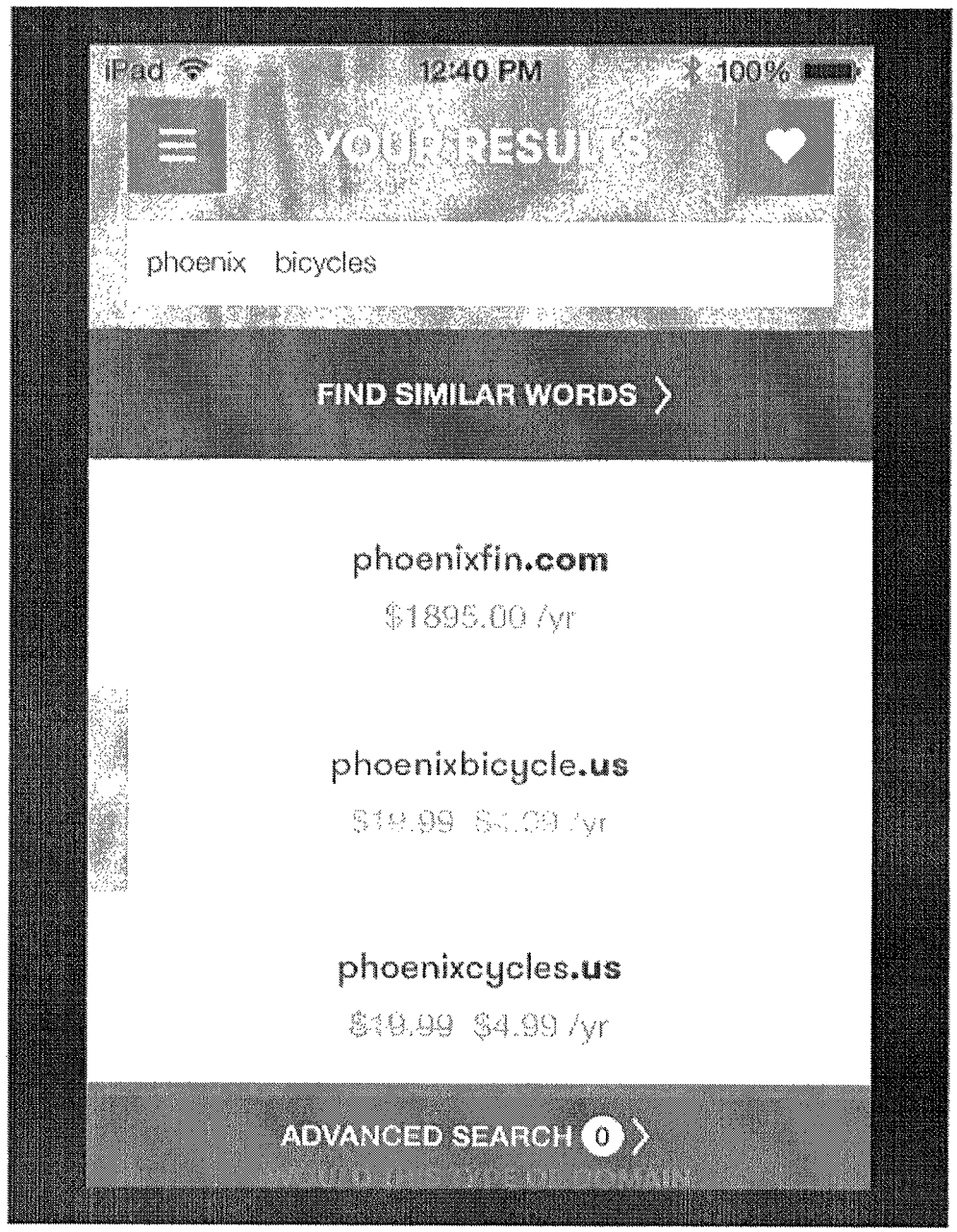
FIG. 4 is an example user interface used in a possible embodiment for selecting a short list of favorite domain names or searches from a generated list of search results or suggested domain names.
Figure 5:
FIG. 5 is an example user interface used in a possible embodiment for selecting a short list of favorite domain names or searches from a generated list of search results or suggested domain names.
Figure 6:
FIG. 6 is an example user interface used in a possible embodiment for selecting a short list of favorite domain names or searches from a generated list of search results or suggested domain names.
Figure 7:
FIG. 7 is an example user interface used in a possible embodiment for selecting a short list of favorite domain names or searches from a generated list of search results or suggested domain names.
Figure 8:
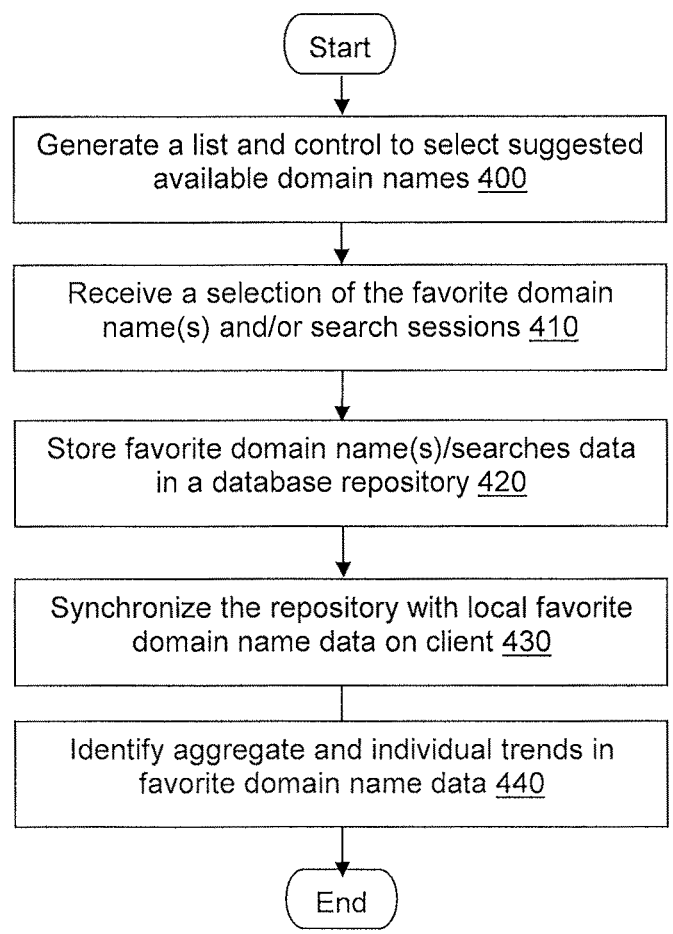
FIG. 8 is a flow diagram illustrating a possible embodiment of a method for selecting a short list of favorite domain names or searches from a generated list of search results or suggested domain names.

Several different methods may be used to provide and manage the present systems. FIG. 4 represents a flow diagram for one possible embodiment of the previously described improvements on presently existing systems. In this example embodiment, one or more server computers 110 may be communicatively coupled to the network 100 and may be configured to: generate a list of suggested available domain names displayed during a domain name search session and at least one user interface control associated with the list of suggested available domain names (Step 400); receive, from at least one client computer communicatively coupled to the network, at least one selection of the at least one favorite domain name (Step 410); store the at least one selection of the at least one favorite domain name in a centralized repository of favorite domain name data, stored in a database communicatively coupled to the network (Step 420); synchronize the centralized repository of favorite domain name data with at least one local favorite domain name data on the at least one client computer (Step 430); and identify, via machine learning, at least one aggregate or individual trend within the repository of domain name data (Step 440).

The steps included in the embodiments illustrated and described in relation to FIGS. 1-4 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising a server hardware computing device coupled to a network and comprising at least one processor executing specific computer-executable instructions within a memory that when executed, cause the system to:
   receive from a first graphical user interface (GUI) displayed on a client hardware computing device during a domain name search session, a user string input comprising a domain name or at least one keyword;
   generate, for display on the client hardware computing device, a second GUI including:
     a first list of available candidate domain names derived from the user string input; and
     a GUI control receiving a selection of a domain name in the first list of available candidate domain names, wherein the selection does not result in a domain name registration, updating an online shopping cart to include the domain name, or terminating the domain name search session;
   receive the selection;
   execute a database query inserting, into a database coupled to the network, a domain name search session data associated in the database with the selection and including:
     a user identifier associated in the database with a user that input the selection;
     a domain name search session identifier;
     at least one keyword token within the user string input;
     a top level domain within the selection; and
     a price for registering the selection;
   generate a third GUI comprising:
     a list of selections associated in the database with the user identifier, the list of selections including the selection;
     a list of at least one domain name search session comprising at least one search parameter from the domain name search session; and
     a second list of available candidate domain names sharing at least one common attribute with the at least one keyword token, the top level domain, or the price, the second list of available candidate domain names being ordered according to a total number of the at least one common attribute.

2. The system of claim 1, wherein the server hardware computing device is further configured to:

detect a network connection between the server hardware computing device and the client hardware computing device;

receive, from the client hardware computing device, at least one domain name selection data stored locally on the client hardware computing device; and execute a database query inserting the at least one domain name selection data into the database.

3. The system of claim 1, wherein the domain name search session data further comprises at least one keyword in a second level domain of the domain name.

4. The system of claim 1, wherein at least one aggregate trend or at least one individual trend calculated from the domain name search session data identifies at least one cluster of data sharing similarities in:

price points;
top level domains; or
subject matter within second level domains.

5. The system of claim 4, wherein:

the at least one aggregate trend applies generally to all users; or
the at least one individual trend applies to a specific user.

6. The system of claim 4, wherein the server hardware computing device is configured to generate, from the at least one aggregate trend or the at least one individual trend: a merchandising strategy based on:

personalized domain name sales;
bundled domain name sales; and
notice of high demand on limited access domain names.

7. The system of claim 1, wherein the server computer is configured to generate a notice displayed via:

a personalized web page;
a personalized domain name control panel; or
an email.

8. A method, comprising the steps of:

receiving, by a server hardware computing device communicatively coupled to a network and comprising at least one processor executing specific computer-executable instructions within a memory, from a first graphical user interface (GUI) displayed on a client hardware computing device during a domain name search session, a user string input comprising a domain name or at least one keyword;

generating, by the server hardware computing device, a second GUI including:
a first list of available candidate domain names derived from the user string input; and
a GUI control receiving a selection of a domain name in the first list of available candidate domain names, wherein the selection does not result in a domain name registration, updating an online shopping cart to include the domain name, or terminating the domain name search session;

receiving, by the server hardware computing device the selection;

executing, by the server hardware computing device, database query inserting, into a database communicatively coupled to the network, a domain name search session data associated in the database with the selection and including:
a user identifier associated in the database with a user that input the selection;
a domain name search session identifier;
at least one keyword token within the user string input;
a top level domain within the selection; and
a price for registering the selection;

generating, by the server hardware computing device, a third GUI comprising:
a list of selections associated in the database with the user identifier, the list of selections including the selection;
a list of at least one domain name search session comprising at least one search parameter from the domain name search session; and
a second list of available candidate domain names sharing at least one common attribute with the at least one keyword token, the top level domain, or the price, the second list of available candidate domain names being ordered according to a total number of the at least one common attribute.

9. The method of claim 8, further comprising the steps of:

detecting, by the server hardware computing device, a network connection between the server hardware computing device and the client hardware computing device;

receiving, by the server hardware computing device from the client hardware computing device, at least one domain name selection data stored locally on the client hardware computing device; and executing, by the server hardware computing device, a database query inserting the at least one domain name selection data into the database.

10. The method of claim 8, wherein the domain name search session data further comprises at least one keyword in a second level domain of the domain name.

11. The method of claim 8, wherein at least one aggregate trend or at least one individual trend calculated from the domain name search session data identifies at least one cluster of data sharing similarities in:

price points;
top level domains; or
subject matter within second level domains.

12. The method of claim 11, wherein:

the at least one aggregate trend applies generally to all users; or
the at least one individual trend applies to a specific user.

13. The method of claim 11, further comprising the steps of generating, by the server hardware computing device, from the at least one aggregate trend or the at least one individual trend: a merchandising strategy based on:

personalized domain name sales;
bundled domain name sales; and
notice of high demand on limited access domain names.

14. The method of claim 8, further comprising the steps of generating, by the server computer, a notice displayed via:

a personalized web page;
a personalized domain name control panel; or
an email.

* * * * *